United States Patent [19]

Eastman

[11] 4,038,482
[45] July 26, 1977

[54] RETORT PROCESS STARCH DERIVATIVES

[75] Inventor: James E. Eastman, Decatur, Ill.

[73] Assignee: A. E. Staley Manufacturing Company, Decatur, Ill.

[21] Appl. No.: 617,770

[22] Filed: Sept. 29, 1975

Related U.S. Application Data

[62] Division of Ser. No. 474,300, May 28, 1974, Pat. No. 3,954,514.

[51] Int. Cl.$^2$ ............................................. C08B 31/04
[52] U.S. Cl. .................................. 536/110; 426/397; 426/407; 426/589
[58] Field of Search ................. 260/233.3 A, 233.3 R, 260/233.5; 536/110

[56] References Cited

U.S. PATENT DOCUMENTS

| | | | |
|---|---|---|---|
| 2,362,282 | 11/1944 | Lindsay | 260/233.5 |
| 2,461,139 | 2/1949 | Caldwell | 260/233.5 |
| 2,935,510 | 5/1960 | Wurzburg | 260/233.5 |
| 3,022,289 | 2/1962 | Tuschhoff et al. | 260/233.5 |
| 3,061,604 | 10/1962 | Kerr et al. | 260/233.5 |
| 3,081,296 | 3/1963 | Smith et al. | 260/233.5 |
| 3,839,320 | 10/1974 | Bauer | 260/233.5 |

*Primary Examiner*—Melvyn I. Marquis
*Attorney, Agent, or Firm*—Charles J. Meyerson; Howard J. Barnett

[57] ABSTRACT

Root and root-type starch derivatives having controlled acetyl substitution levels which provide an initial high paste viscosity to facilitate uniform filling operations when used as a food canning medium, and which break down to a thinner viscosity upon heating to facilitate heat penetration into the canned food mass for sterilization of the canned food product and to provide a more acceptable watery or soup-like consistency to the food product. The thinning phenomenon is accomplished without the requirement of adding any separate hydrolyzing or thinning agent such as an acid or enzyme. It is presently thought that these acetylated starch derivatives are capable of self-hydrolysis under the retort conditions of pH and temperature, and that this autohydrolytic thinning action during heating of the pasted product is sufficient to thin the starch derivative canning media partially or completely, as desired.

Blends of several root and root-type starch derivatives make possible a predictable final viscosity level which is not completely "water-thin." The selection of acetylating agent also affects the final viscosity level of the starch canning medium. It has been observed that a starch derivative substitute using vinyl acetate provides a slightly higher final viscosity under the same retorting conditions when compared to a starch derivative which has been substituted using acetic anhydride.

7 Claims, No Drawings

RETORT PROCESS STARCH DERIVATIVES

This is a division, of application Ser. No. 474,300, filed May 28, 1974 now U.S. Pat. No. 3,959,514.

BACKGROUND OF THE INVENTION

The new FDA regulations highlight the importance of accuracy in the nutritional statements made on canned food labels. For example, if a label statement is made concerning the percentage of protein in the canned food, there is only a limited variation permitted from the declared percentage. Such a requirement makes can-filling uniformity especially important, both from the quality control viewpoint, and from the FDA compliance requirement. There are many methods for obtaining uniform can filling. One of such methods meters each ingredient into the can separately. This can be time consuming, and it is difficult to blend the materials in the can to insure customer appeal.

Another method of can filling blends all the materials in advance of can-filling, and then simply fills each can with the mixed ingredients in a single step operation. This type of filling requires very uniform mixing and suspension of the ingredients during can filling. This uniform suspension can be accomplished by the use of a highly viscous canning media. However, once the can is filled and sealed, the high viscosity canning media can interfere with heat penetration during heat sterilization of the canned product, and a thin, watery consistency is usually desired in many canned products, such as soups, some stews and vegetables.

DESCRIPTION OF THE PRIOR ART

Various references recognize in a general way that liquid suspensions of starches which have been modified by esterification and etherification, and by crosslinking esterification and etherification reactions will have different pasting characteristics, and different viscosity behavior characteristics when subjected to continued heating after pasting. It is well recognized that most of these modified starches become thicker upon pasting, but with continued heating, they lose some viscosity. However, upon cooling, most tend to thicken again. See: Whistler et al., Starch: Chemistry and Technology, Vol. II. Academic Press (1967); FIG. 2, page 385.

U.S. Pat. No. 3,635,741 describes a "converting starch having high initial viscosity when first gelatinized but which exhibits a substantially reduced viscosity when cooked at retort temperatures." This reference teaches blending starch with about 0.2% by weight of ascorbic, araboascorbic or dihydroxymaleic acid. When the starch/acid admixture is dispersed in water and heated, it first exhibits thick viscosity upon pasting, but with continued heating, acid hydrolysis takes place and the viscosity decreases. The method depends, to a large extent, on the uniformity of the blending step. The reference also suggests blending the "converting starch" blend with other "conventional starches" such as a crosslinked tapioca or waxy maize.

U.S. Pat. No. 3,238,193 described a method of modifying starch to obtain desired viscosity characteristics. One of the reagents disclosed for acetylating starch is vinyl acetate. This reference mentions that certain cereal starch acylates, such as those prepared following U.S. Pat. No. 2,461,139 tend to become "watery and thin" upon cooking, which is undesired in a pie filling. U.S. Pat. No. 2,935,510 further described the starch modifications set forth in U.S. Pat. No. 2,461,139, and concentrates on root and root-type starches, however. U.S. Pat. No. 2,935,510 describes the freeze-thaw stability gained from the combined crosslinking/substitution reactions set forth in U.S. Pat. No. 2,461,139, although no reference is made to the earlier, commonly assigned patent. The totality of this disclosure is aimed at avoiding viscosity stability problems during freeze/thaw cycles, and no mention is made here of any starch product having an initial thick pasted viscosity which thins substantially during subsequent cooking.

Auto hydrolysis of potato starch is disclosed in a German language article appearing in Die Starke 23. Jahrg 1971/N11, Palasinski et al. *Die Selbsthydrolyse der Kartoffelstarke*, pp. 383–390. However, this article does not disclose a substituted starch, nor does it disclose retorting of such a substituted starch. The phenomenon is treated as a scientific observation only, with no attempt to find a practical application for the observed "self-hydrolysis." In addition, the time for the effect to occur is reported to be "several weeks" without heating. No practical application for the phenomenon is proposed, and the starch observed was unmodified potato starch.

SUMMARY OF THE INVENTION

As presently contemplated, root and root-type starches are preferred as the base starch to make a thick-thin retort starch useful according to the method of the present invention. Potato starch is particularly suited for applications in which a completely water-thin final viscosity level is desired. Acetylated waxy maize (considered a root-type starch) is preferred when a somewhat thicker final viscosity is desired. Other root-type cereal starches which can be used include waxy sorghum, waxy milo and waxy rice. Also useful are other root or tuber starches including starches of sweet potato, yams, cassava (tapioca), taro, and arrowroot.

The important criteria for selecting a particular starch derivative, or blend of starch derivatives to be used as a "thick-thin" canning media are: filling viscosity characteristics required (this depends in part on the size and density of the food particles being filled); flavor characteristics (some foods require very bland canning media to avoid masking delicate food flavors); pH conditions created by the food; desired final viscosity level (chunky beef soups are usually thicker than potato soups or vegetable soups); and pressure, time and temperature conditions required in the retort process to obtain the desired sterilization of the food product.

The general viscosity behavior desired can be obtained from acetylated root and root-type starches which have a hot (185° F.) paste viscosity greater than 2,300 cps (20 rpm Brookfield) and a retorted viscosity less than 150 cps (20 rpm Brookfield) when a 5% (dsb) sample of the starch derivative suspended in distilled water with 1.2% NaCl, adjusted to pH 6.0 ± 0.1 (with NaOH or HCl) and the starch is heated (pasted) on a steam bath to 185° F. and hot paste viscosity measured. Thereafter, the pasted sample is sealed in an 8 oz. can, recorted for 1 hr. at 250° F. (in an autoclave), allowed to cool overnight at 74°–76° F., and then the retorted viscosity is measured as before.

The 5% (dsb) sample of the starch derivative initially forms a viscous cooked paste as described above when heated under atmospheric pressure. The viscosity of this sample almost completely disappears when the sample is heated in a sealed container for about 20-60 minutes to a temperature of at least about 210° to 260° F.

A 3-7% by weight starch in water cooked paste exhibits a Brookfield viscosity of at least about 2,000 centipoise. After the sample sample has been cooked for at least 20 minutes, the same sample exhibits a substantial loss of viscosity to a viscosity of no more than 150 centipoise.

DETAILED DESCRIPTION OF THE INVENTION

EXAMPLE I

A.

Tapioca starch in 40% aqueous slurry at room temperature (70°-80° F.) was reacted with 7.5% vinyl acetate for 30 minutes using 1.85% tribasic sodium phosphate as a catalyst. Slurry pH was then adjusted to 3.0, and stirred for 25 minutes, forming some distarch acetal links from acetaldehyde generated during the acetylation reaction. The slurry was then adjusted to pH 5, the starch filtered, washed and dried.

B.

The above process was repeated, but waxy maize was used instead of tapioca as the base starch.

The above products were analyzed for acetyl, and were subjected to Brabender viscosity tests and continuous retort evaluation. The results are summarized below in Table I.

TABLE 1

| Sample | % Acetyl | Peak T(° C.) | Peak Brabender | 30 min. 95° C. | Internal Can Temp(° F.) Continuous Retort/20" |
|---|---|---|---|---|---|
| IA | 2.92 | 65.0° | 665 | 575 | 223°-240° |
| IB | 3.17 | 68.5° | 795 | 705 | 206°-236° |
| II | 2.76 | 69.5° | 195 | 195 | |

It was observed that the above products at both 3% and 5% solids levels gave best results in continuous retort tests at a more acid pH (4) than at pH 5.

EXAMPLE II

Acetylated, $POCl_3$ crosslinked waxy maize was made by adding 40 g. (2%) anhydrous sodium carbonate to a 40% aqueous slurry of 2,000g. of waxy maize. The slurry was warmed to 100° F., and 120 g. (6%) of vinyl acetate was added. After 30 minutes, a cold solution of 2 g. (0.1%) $POCl_3$ in 100 ml. of water was added with rapid stirring. After 30 min., the slurry was adjusted to pH 5.5, filtered washed and dried. As shown in Table I above, the Sample II starch exhibited constant viscosity cosity upon being retorted. This indicates that the higher level of $POCl_3$ crosslinking used here (0.1%) caused the product to be too stable for use as a thick-thin starch.

EXAMPLE III

Potato starch was first treated with sodium hypochlorite (0.026-0.22% active chlorine, based on starch weight) in a 40% aqueous slurry, buffered with phosphates to maintain a pH of about 7.0-7.3. The reaction was continued at 98°-102° F. for about 4 hours to a target alkali fluidity of 35-40 ml. for a 2 g. (dry substance) sample, 0.375N NaOH measured following the test method described below (following Example V). Then 5.75 lbs. vinyl acetate/100 lbs. of starch (dry substance) was added rapidly. About fifteen minutes after the above addition was completed, about 2 lbs. $Na_2CO_3$/100 lbs. of starch (dry substance) was added, and allowed to react for about 10 minutes after all $Na_2CO_3$ was added. The slurry was then adjusted to 6.9-7.1 pH with the slow addition of 25% $H_2SO_4$. Care should be taken to prevent the pH from going below 4.5 to avoid crosslinking, preferably not below 6.5 to avoid evolution of $CO_2$ and foaming. The slurry of oxidized, acetylated potato starch was then diluted to about 10° Be and centrifuged to produce a desalted, aqueous product of about 21° Be. The slurry pH as then adjusted to about 5.0-5.5 using $Na_2CO_3$ or $H_2SO_4$ as necessary. The slurried product was then screened and desalted in the centrifuge a second time. It was then dewatered and the wet cake was flash dried.

The oxidized, acetylated potato starch so obtained was then tested for thick-thin viscosity behavior according to the test method described below after Example V. This product exhibited excellent thick-thin viscosity which makes it an ideal canning medium for chunky soups, and other canned products which are sterilized by retort after the cans are sealed.

EXAMPLE IV

Waxy maize was slurried in 90-95° F. water to about 19-20° Be., and about 5.75% by weight vinyl acetate (based on starch, dry substance) was added rapidly, and about 2% by weight $Na_2CO_3$ was added. The mixture was allowed to react for about 10 minutes after $Na_2CO_3$ was added. The slurry pH was then adjusted to about 6.7-7.1 pH with sulfuric acid. About 0.7% by weight $H_2SO_4$ was required. Care is taken to maintain pH above 5.5, and preferably, above 6.5 to avoid crosslinking, foaming and $CO_2$ gas generation. Filtering of the reacted slurry should be done promptly to insure product quality. The filter cake was then thoroughly washed, and the crude product was dewatered, desalted, screened and dried as before. The final pH of the uncooked product was about 5-6.5. The Brabender viscosity in 6.5 buffer was as follows:

| Initial viscosity at 95° C. | 500-650 B.U. |
|---|---|
| Viscosity after 30 minutes at 95° C. | 300-500 B.U. |

The acetyl content of this product was about 2.0-2.5% by weight, based on the dry substance weight of the starch. Typical pH of the product (as adjusted, before drying) was about 5 to 6.5. When the product was cooked at about 190-195° F. at atmospheric pressure for about 10 min., the Brookfield viscosity was 3,000-3,800 cps. After retorting the cooked paste in a sealed can in a continuous agitation oil bath retort having a retort heating temperature of 250° F., the Brookfield viscosity was again measured (at about 75° F.) it was found to be 150 cps. maximum, indicating true thickthin viscosity behavior during retorting. The heat penetration rate increased rapidly as the pasted starch broke down during the initial stages of retorting, and reached the $F_o$ value required for completely effective sterilization of the canned product within 40 minutes after commencement of retorting. It was observed that some residual viscosity of the starch mediium existed after retorting, especially when compared to the potato starch product of Example IV, which was completely watery and thin after the same retorting test.

The apparatus used for obtaining the information recorded in the examples was designed to duplicate on a smaller scale the process environment for a typical continuous retorting system. Comparison of these tests with performance tests on actual continuous retorting equipment has confirmed the accuracy of the observations made with the laboratory equipment.

The test equipment used to obtain the data reported in the examples included a mineral oil bath, controlled heat input means for maintaining the bath at the required temperature range (about 190°–260° F.), and oscillatable conveyor means for moving the individual test cans through the oil bath. Thermocouples for recording internal food mass temperatures are provided to be inserted in each test can, and have pressure sealing means for the external connection. A thermocouple is also provided to record the oil bath temperature. Each can sample weighed about 300 grams, since the test cans were number "one" size (about 300cc.).

The individual cans filled with the starch retort media were clamped to the conveyor means, and the thermocouples inserted. The oil bath temperature control was set for a bath temperature of about 240° F., plus or minus about 2° F., and the filled test cans were immersed in the heated oil bath, and rotated about 270° in one direction, and then in the opposite direction at a total speed of about 20 rpm for a time period of about 20 minutes. Temperatures inside each can were recorded automatically and were noted as indicated in the examples. The slurries used in these tests were mixed to duplicate the food canner's typical canning media requirements.

The alkali fluidity test referred to herein was found to be the most convenient means of controlling the degree of crosslinking, and is accomplished with the same equipment in all the examples given. The test is generally described in U.S. Pat. No. 3,238,193 at the paragraph bridging columns 7 and 8. The concentration of the alkaline starch dispersion for a particular test sample is determined by adding 90 ml. of 0.375 N sodium hydroxide to a slurry of neutralized, filtered, waterwashed wet starch cake containing 2 grams of the starch derivative, dry solids basis (d.s.b.). The sample is slurried in water to make 10 ml. of total water prior to the addition of 90 ml. of 0.375 N sodium hydroxide. After mixing the starch slurry with the sodium hydroxide solution, the suspension is stirred at between 450 and 460 rpm for three minutes in order to paste the starch. The resulting starch solution is poured into a fluidity funnel having a specific water time between about 30 and 40 seconds. the number of ml. of starch solution which flows through the funnel in the "water-time" (defined below) is the alkali fluidity of the starch. The extent of cross-linking is monitored by repeating the above test at regular intervals with samples taken from the reaction mixture. When the alkali fluidity test is within the desired range, the cross-linking reaction is stopped.

The fluidity funnel used for the alkali fluidity tests described herein comprises two main parts, a funnel body and a funnel tip threadably attached thereto. A simple, plunger-type, tapered valve on a glass stem can be used to manually control flow through the funnel orifice. The funnel parts are precision-machined from stainless steel stock, and polished to very smooth surfaces on all parts which come in contact with the test samples.

The funnel body defines a generally cone-shaped vessel having a sixty degree angle (or taper) between opposite, converging funnel walls. Funnel body height is sufficient to hold at least a 100 ml. sample, and a 0.277 inch orifice and fluid passage is provided at the narrowest portion of the funnel for attachment to the funnel tip. The fluid passage is 1½ inches in length from the orifice to the narrow end of the funnel body. The opposite, wide orifice of the funnel body is oriented upwardly, and the tapered valve is inserted downwardly from above into the smaller orifice during the tests. Operation of this valve against the "water-time" of the funnel gives the test readings. The funnel tip is a cup shaped member, which is threadably received on the narrow end of the funnel body. The internal chamber of the funnel tip is hemispherical and has a 3/16 inch diameter with a lower central opening of 0.070 inch which is 0.0492 inches in length. The total height from the lower end of the funnel body passage to the lower external orifice of the funnel tip includes the height of the tip chamber (0.1008 inches) and the length (0.0492 inches) of the funnel tip opening.

The composite apparatus described above is vertically disposed above a graduated cylinder for the actual tests. At the beginning of each test, the water-time for the apparatus is checked by running 100 ml. of pure water through the funnel and recording the total elapsed time. The water-time then becomes the time against which each sample is tested.

The flow through the funnel during the water-time is measured in milliliters and recorded after each test. The funnel is thoroughly washed between each test to avoid irregular observations. The above alkali fluidity test procedure was followed throughout the tests, using a 2 gm., d.s.b. starch derivative sample.

SUMMARY

Many other starch modifications are contemplated as being useful for thick-thin retorting methods. For example, the acetylating agent could be acetic anhydride. As noted above, the oxidation step can be omitted. It is also possible to react the base root or root-type starch with a polyfunctional crosslinker, such as adipic anhydride in combination with acetic anhydride, is done in the proportions which will give the required thick-thin viscosity behavior. Blends of several modified starches are also useful, when a canning medium is desired which is not completely water-thin after retorting. In such a case, a blend of about 65% of the modified waxy maize starch described in Example IV, with about 35% of a hydroxypropylated, epichlorohydrin crosslinked waxy maize starch derivative, having high viscosity cookup stability, has given the desired final viscosity in retorted product, such as cream-style corn.

In general, it may be stated that the root and root-type starch derivatives give best all-around performance as thick-thin canning media. Potato-based derivatives are particularly good when a completely thin medium after retorting is needed. The general statement of the criteria of a successful thick-thin product includes the following possible products and ranges:

1. Acetylation with up to 12% vinyl acetate of 12% acetic anhydride.
2. Acetyl levels of 0.02 to 0.295 D.S. (about 0.05 -6.0% acetyl).
3. Acetylated starches previously or subsequently treated with very low levels of sodium hypochlorite bleach: the purpose being to toughen or slightly inhibit the starch and thereby increase its hot paste viscosity so that less starch may be used to suspend food pieces.

4. Low levels of acetaldehyde crosslinking following acetylation with vinyl acetate for the purpose expressed in 3 above.

5. Reaction of starch with the mixed anhydrides of acetic-adipic, acetic-succinic, acetic-fumaric, or in general acetic-polyfunctional carboxylic acid, where the amount of polyfunctional crosslinker is less than 0.05% based on the d.s. weight of starch.

6. Acetylated starches previously or subsequently treated with 0.1 to 1.0% active chlorine (based on the dry weight of starch) for the purpose of accelerating the viscosity breakdown during retorting or achieving a lower final viscosity in the retorted starch paste.

A test which serves well to define thick-thin acetylated root and roottype starches is set forth below:

The starch is suspended in distilled water at 5% dsb with 1.2% sodium chloride. After adjusting the slurry to pH 6.0 ± .1 with dilute NaOH or HCl, the starch is heated (pasted) of a steam bath to 185° F. and the Brookfield viscosity measured.

The paste is then retorted for 1 hr. at 250° F. (in an autoclave) in an 8 oz. can and allowed to cool overnight to 74°-76° F.

The Brookfield viscosity is again determined.

An acceptable product is defined as one which has a hot (185° F.) paste viscosity greater than 2300 cps (20 rpm Brookfield) and a retorted viscosity less than 150 cps, using a Model RVT Brookfield viscometer.

It has not been found necessary to oxidize the waxy maize-based thick-thin starch derivatives described above, and care must be taken to avoid more than very light crosslinking because the starch products will not breakdown during retorting if they are too heavily crosslinked. This is why pH control (above 3.5 pH) is important during the acetylation reactions.

I claim:

1. A modified starch derivative which exhibits thick viscosity characteristics upon atmospheric heating but which subsequently decreases subtantially in viscosity upon continued heating in a sealed container consisting essentially of a base starch selected from the group consisting of root and root-type starches, said modified starch having 0.05–6% acetyl groups substituted thereon to give a degree of substitution of 0.02 to 0.295 and a 5% dsb sample of said starch being capable of forming a viscous cooked paste when subjected to heating to 185° F. under atmospheric pressure, said sample having a hot paste viscosity of greater than 2,300 centipoise (20 rpm Brookfield), but further exhibiting substantially complete loss of viscosity to a retorted viscosity of less than 150 centipose (20 rpm Brookfield) after being heated in a sealed container for at least about 20–60 minutes to a temperature of at least about 210°–260° F. in an autoclave, and being allowed to cool overnight at 74°–76° F.

2. The starch derivative of claim 1, in which the base starch is selected from the group consisting of tapioca, arrowroot, potato, sweet potato, yam, taro and waxy cereal starches including maize, milo, rice and sorghum.

3. The starch derivative of claim 1, in which the base starch is potato starch which has been first slightly oxidized, and said starch derivative has a 2 g d.s. alkali fluidity of 30–60 ml.

4. The starch derivative of claim 3, in which the potato starch has been first oxidized with about 0.1 to 1% active chlorine.

5. The starch derivative of claim 1, in which the base starch is waxy maize.

6. The starch derivative of claim 1, in which the base starch is tapioca.

7. The starch derivative of claim 1, in which the Brookfield viscosity of a 3–7% starch in water-cooked paste of the starch derivative is at least about 2,000 centipoise, and which the Brookfield viscosity of the same sample after cooking for at least 20 minutes in a sealed container is no more than 150 centipoises.

* * * * *

UNITED STATES PATENT AND TRADEMARK OFFICE
CERTIFICATE OF CORRECTION

PATENT NO. : 4,038,482
DATED : July 26, 1977
INVENTOR(S) : James E. Eastman

It is certified that error appears in the above-identified patent and that said Letters Patent are hereby corrected as shown below:

Column 1, line 61, for "described" read ---describes---
Column 1, line 68, for "described" read ---describes---
Column 2, line 62, for "recorted" read ---retorted---
Column 3, Table 1, line 63, 3rd heading; for "Peak T (°C)" read ---Pasting T (°C)---
Column 3, line 52-53, for "viscosity cosity" read ---viscosity---
Column 4, line 11, for "as" read ---was---
Column 4, line 65, for "mediium" read ---medium---
Column 6, line 42, for "is" read ---if---
Column 7, line 15, for "roottype" read ---root-type---
Column 8, claim 1, line 12, for "centipose" read ---centipoise---

Signed and Sealed this

Twenty-second Day of November 1977

[SEAL]

Attest:

RUTH C. MASON
Attesting Officer

LUTRELLE F. PARKER
Acting Commissioner of Patents and Trademarks